Sept. 15, 1936.                    E. D. DOYLE                      2,054,411
                            SYSTEM OF DISTRIBUTION
                            Filed Oct. 28, 1931            3 Sheets-Sheet 2

Inventor
Edgar D. Doyle
By Cornelius D. Ehret
his Attorney.

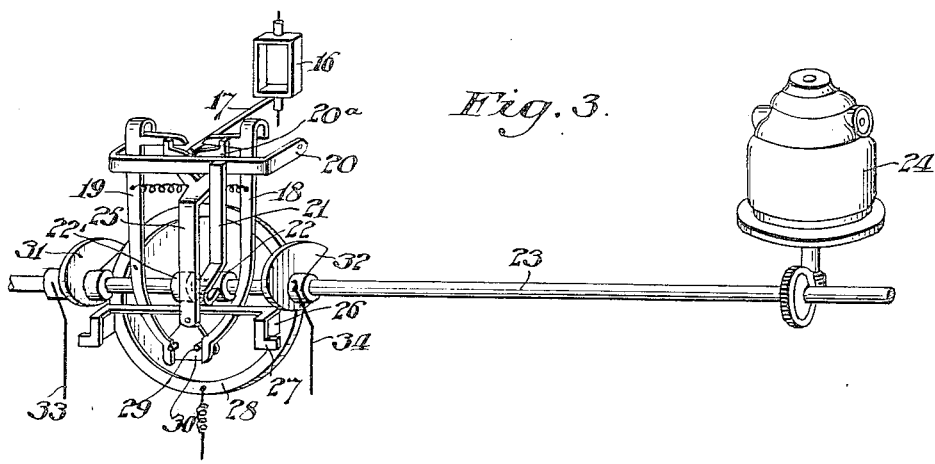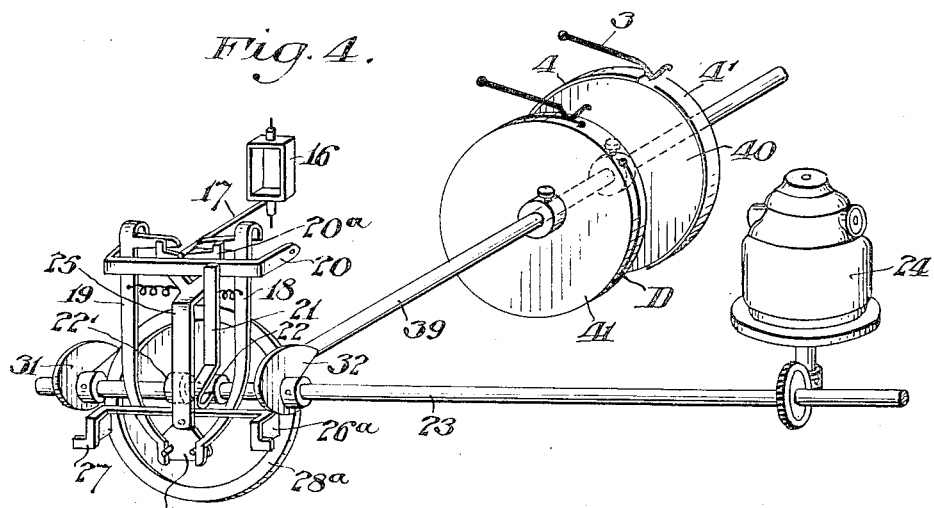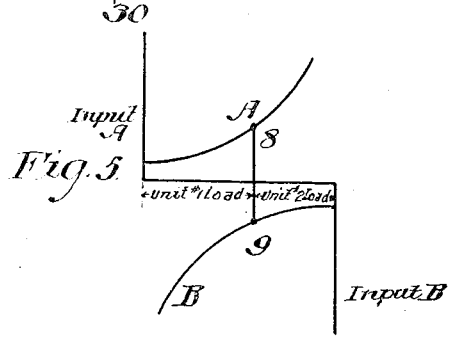

Patented Sept. 15, 1936

2,054,411

UNITED STATES PATENT OFFICE 2,054,411

SYSTEM OF DISTRIBUTION

Edgar D. Doyle, Philadelphia, Pa., assignor to Leeds & Northrup Company, Philadelphia, Pa., a corporation of Pennsylvania Application October 28, 1931, Serial No. 571,519

14 Claims. (Cl. 290—4)

My invention relates to methods of and apparatus for controlling the distribution, as of load, between several units adapted, for example, to deliver energy to a common energy-consuming system, particularly between several electrical generating units delivering current to a common line or network.

In accordance with my invention, individual units, at least one of which is provided with a speed or frequency control means, are controlled to maintain a desired group load and/or a desired relation between the outputs of the individual units.

More specifically in accordance with my invention, the group operating efficiency of two or more alternating current generating units is maintained substantially at maximum by a control system effecting operation of the units at points of their respective input-output curves having substantially the same slope and in addition, one or more of the units is subject to a control responsive to changes in line frequency.

More specifically, and in one form of my invention, one of the units is controlled to maintain the line frequency substantially constant, and the other unit or units are controlled to operate at points of their input-output curves having the same slope as the operating point of the first or master unit.

In accordance with another form of my invention, several generating units are each provided with a frequency controller and the operation of each of the frequency controllers is modified or biased by a load responsive device associated with the corresponding unit so that the load-bias of each frequency controller is a function of the slope of the input-output curve of that unit, and economic division of total load between the units is effected.

My invention further resides in the systems hereinafter described and claimed. This application is a continuation in part of my co-pending application Serial No. 305,597, filed September 12, 1928.

For an understanding of my invention, reference is to be had to the accompanying drawings, in which:

Figs. 1 and 2 diagrammatically illustrate generating systems embodying my invention.

Figs. 3 and 4 are perspective views of control mechanisms utilizable in the systems of Figs. 1 and 2.

Figs. 5 and 6 are explanatory curves referred to in description of the operation of the systems of Figs. 1 and 2.

Figure 1:
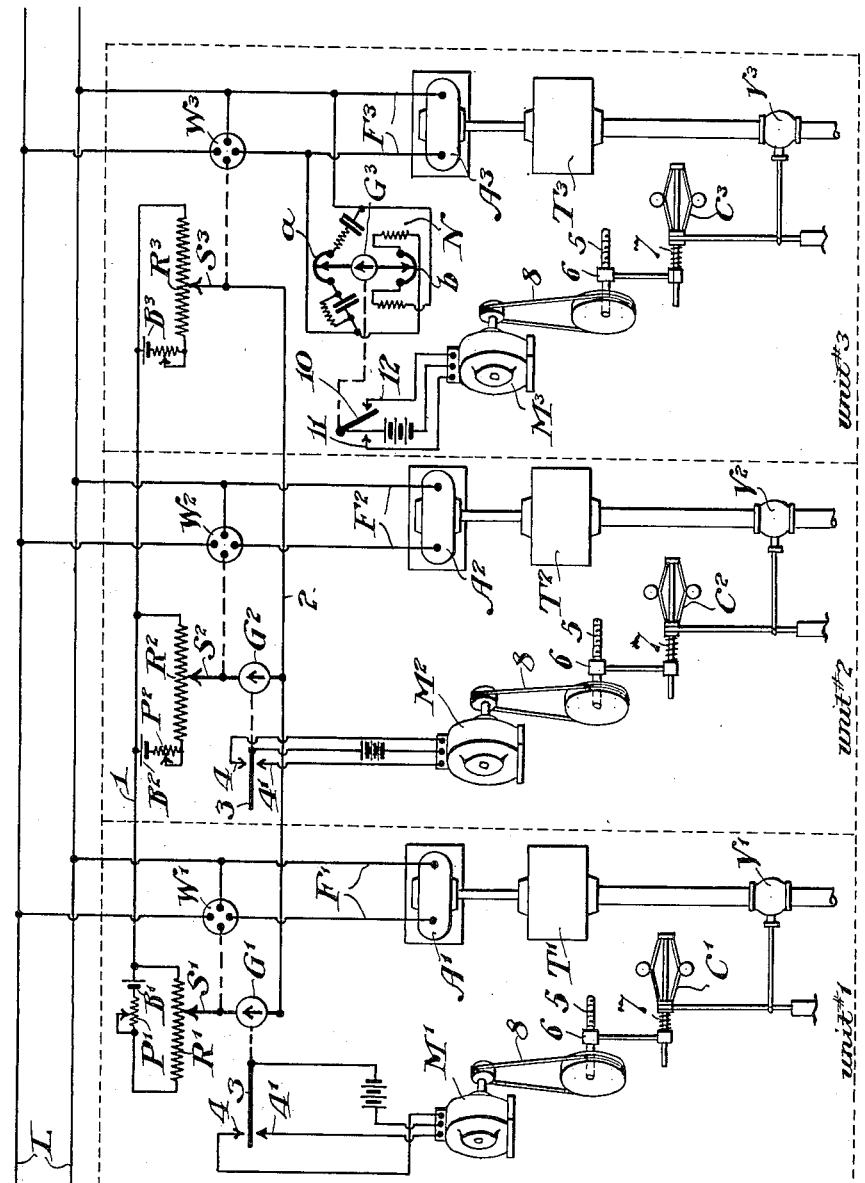

Referring to Fig. 1 of the drawings, unit #1 within the left-hand dotted enclosure comprises apparatus for generating and delivering electrical energy to a line L and includes in the example shown, a suitable prime mover, as a turbine T1, the motive power of which, steam, for instance, is controlled by the position of the valve V1. A governor mechanism C1 driven by the turbine T1, through suitable mechanical connections, varies the position of the valve V1 to maintain the speed of the turbine and of the alternator A1 driven thereby substantially constant for any given setting of the governor.

To the movable structure or element of a watt meter W1 connected to the feeder circuit F1 of alternator A1, is mechanically connected a contact S1 movable or slidable along a potentiometer resistance R1 connected across a suitable source of current, as battery B1. The magnitude of current flowing through the resistance R1 and therefore the potential of any and all points thereof with respect to the conductor 1, for example, may be adjusted to a suitable value by variation of resistance P1. Thus far described, as the load upon the generator or alternator A1 varies, for each magnitude of load, there is a predetermined, definite position of contact S1 and uniquely determined potential between contact S1 and conductor 1.

Unit #2 of Fig. 1 is or may be generally similar to unit #1 although the elements thereof may be of different characteristics, ratings, etc. The speed of prime mover T2 which drives alternator A2 is determined and controlled by governor mechanism C2 suitably associated with the movable element of valve V2. The position of contact S2 along resistance R2 is determined by the position of movable structure of watt meter W2 to which it is connected. An adjustable resistance P2 is provided to permit flow of a desired magnitude of current through resistance R2. For each position of contact S2 as determined by the load upon alternator A2, there is a predetermined difference of potential between contact S2 and conductor 1 which connects terminals of like polarity, of resistances R1, R2, and others subsequently referred to.

There is included in circuit with conductor 2 between contact S1 and S2, one or more instruments, as galvanometers G1 and G2, or equivalent, adapted to control the direction of rotation and time of energization of associated motors M1 and M2, respectively, which, through suitable speed-reduction mechanism, change the settings of governors C1 and C2. For example, if the potential of contact S2 is higher than that of contact S1, current flows through galvanometer G1 in a direction effecting movement of switch arm 3, by mechanism hereinafter described, into engagement with contact 4 to effect rotation of the armature of motor M1 in a predetermined direction. A shaft 5 threadably engaged by a nut end of an arm 6 whose position determines the tension of governor spring 7 is driven by the rotor of motor M1, as through belt 8, or equivalent and rotated in a direction increasing the tension of the spring 7, thereby changing the governor setting in a sense effecting greater opening of valve V1 and increase in speed of turbine T1 and alternator A1. As the latter takes on more load, the position of contact S1 changes until there is no difference of potential between contacts S2 and S1 whereupon the movable structure of galvanometer G1 returns to its normal position, and breaks the circuit of motor M1 through contact arm 3. The governor setting remains at its new value until there is again a difference of potential between contacts S1 and S2.

To shorten the period in which equilibrium is obtained, the second galvanometer G2 is included in series with galvanometer G1 and is so connected or wound as to be deflected in an opposite sense, or if deflected in the same sense the connections between motor M2 and the switching mechanism controlled by the galvanometer is such that as the setting of the governor of unit #1 is being changed to increase the speed of turbine T1, the setting of the governor of unit #2 is being simultaneously changed to decrease the speed of turbine T2.

As the load changes from one value to a new value, the governor settings of the units are automatically changed as above described to effect desired distribution of the total load between them. Referring to Fig. 5, the curve A represents, for example, the input-output curve of unit #1, and curve B represents a similar curve of unit #2. For any given total load of units 1 and 2, the maximum group efficiency is obtained when the units are operating at points on their input-output curves having the same slope, that is the same relative rates of change of input and output. If it be assumed that the input-output curves of the units are of the shape shown and that curves A and B, at points 8 and 9 respectively, have the same slope, it is apparent that if input of unit #2 is decreased the input of unit #1 would have to be increased by a greater amount, increasing the total input of the units for the same output. Conversely, if input of unit #1 is decreased then the input of unit #2 would have to be increased by a greater amount to maintain the same output of the group of two machines.

The resistances R1, R2, and similar resistances, if more than two units are comprised in the group, are each graded to follow the slope-output curve of the particular machine with which it is associated, that is, in accordance with the ratio of a small change in input to the corresponding change in output, throughout the range of variation of input. As the positions of contacts S1, S2, etc. are determined by the output of the several machines, the potentials thereof are representative of the slope of the input-output curves at the points of operation. When the machines are operating at points of their input-output curves having the same slope, the contacts S1, S2 are at the same potential. Upon occurrence of any change which disturbs that relation, there is produced a potential difference between the contacts which is utilized as above described to control operation of one or more of the units to re-establish balance of the potentials and operation of the units at points of their input-output curves having the same slope.

Alternatively, the resistances R1, R2, etc. may each be graded to follow the slope-input curve of its associated prime mover in which event the positions of contacts S1, S2, etc. are determined by the inputs of the respective units, that is, in accordance with the ratio of a small change in output to the corresponding change in input. The contacts could be moved, for example, by the movable structures of flow meters, between the turbines T1, T2 and the controlled valves V1, V2, as disclosed in my aforesaid application.

The resistances R1, R2 need not be of varying resistance for equal increments of length if there be interposed suitable motion-translating mechanism between contacts S1, S2, and the movable contact-actuating structures of watt meters W1, W2 to effect for all positions of the contacts, respective potentials representative of the slopes of the input-output curves of the units at their points of operation.

The number of units may be increased to any desired number to attain the same result, that is maximum group efficiency, by connecting between the control circuit conductors 1 and 2, for each unit a potentiometer arrangement as above described. The resulting arrangement is flexible in that the generating units may be cut in and out of operation, for any reason or purpose, without change or replacement of any of the elements comprising the control of potentiometer circuit, or the control mechanism, of the units remaining in service. For example, if one of three or more alternators are disconnected from the line L, the electrical load previously carried by all is automatically redistributed among the remaining alternators and in a manner effecting maximum efficiency of the new group of generating units under the new conditions of individual, unit load.

The several turbines may be supplied from a common source, as a bank of one or more boilers, or from individual sources, in which latter case the potentiometer resistances may be graded to take into consideration the characteristic of the boilers associated with the respective units. Further the units may be remote from each other, rather than in the same power plant structure or site, in which event "input" as a component of the input-output curve may be considered as the cost of fuel, etc. for the boilers, and/or "output" as the power, or price of power, at the point of consumption.

Referring again to Fig. 1, there is associated with unit #3 suitable control mechanism for maintaining substantially constant the speed of alternator A3, which may be, for example, of the character disclosed in Wunsch Patent 1,751,539. A network N, specifically a Wheatstone bridge in form, is connected across the feeders F3 from alternator A3. Upon departure of the frequency from a desired value, there exists between points a and b a difference of potential causing deflection of galvanometer G3, the movable structure of which is associated with the movable switch member 10, adapted to engage fixed contact 11 or 12 depending upon the sense of change of frequency. For example, upon decrease of frequency, as for instance by increase of load upon line L, galvanometer G3, or equivalent, causes switch arm 10 to engage fixed contact 11, energizing motor M3 to effect through mechanism generally similar to that previously described in connection with units 1 and 2, change in setting of governor C3 to increase the speed of alternator A3.

The watt meter W3 included in the feeder circuit F3 is responsive to the increase in load on alternator A3 and through suitable mechanical connections shifts the contact S3 along potentiometer resistance R3 to a position at which its potential is representative of the slope of the input-output curve of unit 3 at its point of operation under the increased load. The galvanometers G1 and G2 deflect in senses determined by the relative potentials of contacts S1 and S2 with respect to S3 and to each other to effect operation of units 1 and 2 at points of their input-output curves having the same slope as that of the master, frequency-controlled unit #3. As a result, the line frequency, and hence the speed of the alternators is maintained substantially constant for varying conditions, as of load, and additionally the efficiency of the group of generating units including the frequency-controlled or master unit, is maintained substantially at a maximum.

Figures 2, 6:
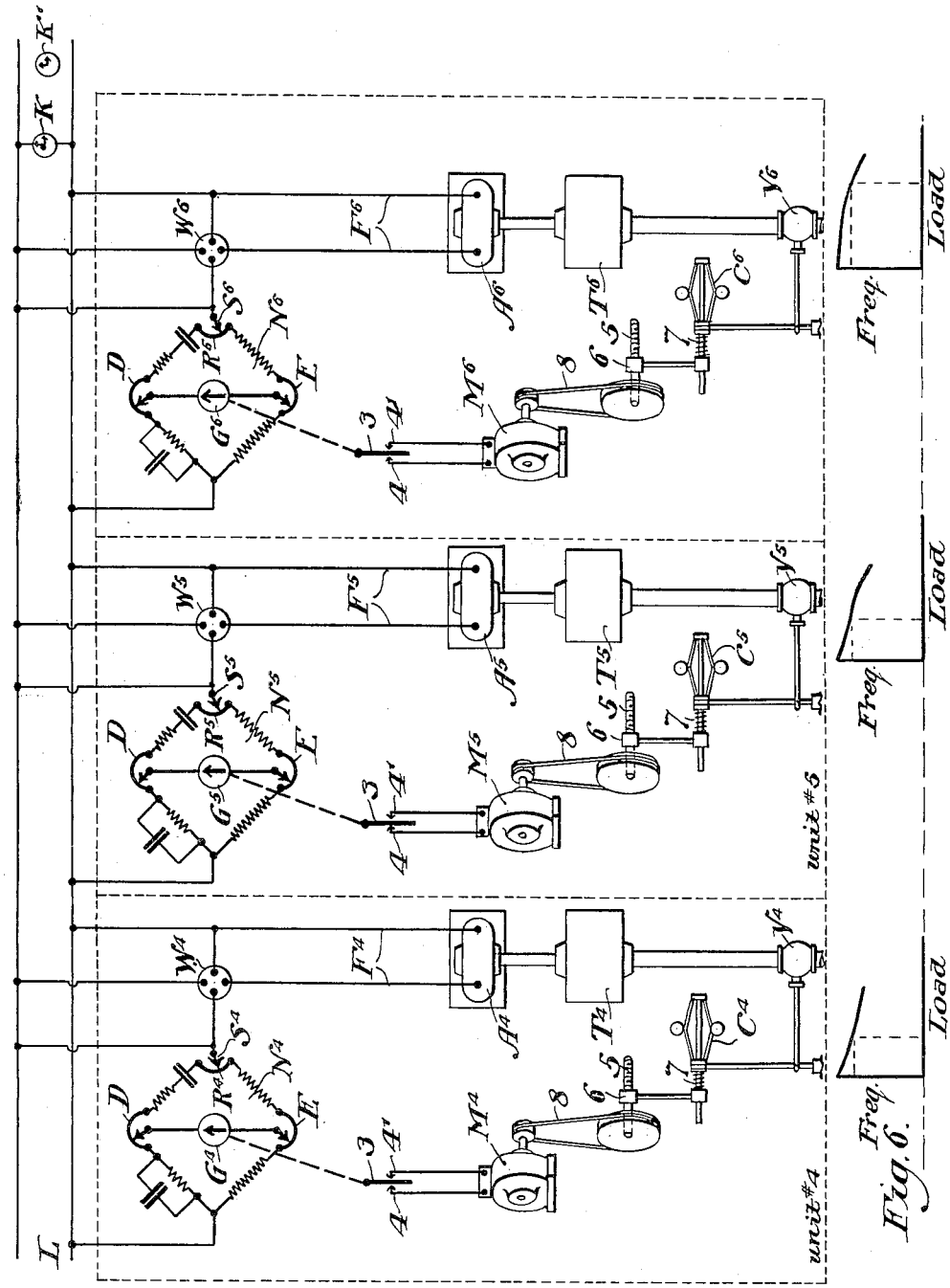

Referring to Fig. 2, unit #4 comprises an alternating current generating unit similar to those previously described, the setting of whose governor C4 is controlled by a frequency responsive network generally similar to the network N of unit #3. However, the frequency at which the network is balanced varies with the load upon the unit. Specifically and in the arrangement described, the watt meter W4 changes the position of a contact S4 along the resistance R4 included in the network N4.

Similarly, each of the units 5, 6, etc., is provided with an individual frequency responsive network, including an impedance whose magnitude is varied to change the frequency at which the bridge is balanced with change in load upon the individual unit. In unit #5 the watt meter W5 changes the position of contact S5 along resistance R5 of network N5, and similarly in unit #6 watt meter W6 changes the position of contact S6 along resistance R6 of network N6.

Since the alternators are in parallel, it is apparent that the individual control systems will be in equilibrium only when the several networks are balanced at the same frequency. In other words, the individual governor settings will be such that the loads carried by the individual machines effect balance of the several networks N4 to N6, at a common frequency.

Assuming that there is an increase, for example, in total load, the line frequency falls. Each of the networks is therefore temporarily unbalanced and the galvanometers G4, G5, and G6 deflect to energize motors M4, M5 and M6 to change the governor settings. This control action continues until the positions of contacts S4, S5 and S6 are such that the bridges are in balance at the new line frequency. The slide wires R4, R5 and R6 are so graded, or the mechanical connections between the slide wire contacts and the watt meters are such that this balance is obtained only when the loads of the individual units are of such magnitude that the units are operating on points of their input-output curves having substantially the same slope, as in the modification of Fig. 1. Otherwise stated, the load bias of each of the frequency responsive networks is such that all networks are balanced at line frequency only when the economic distribution of load is effected between the units.

In Fig. 6 the curve below each unit is representative of the load bias which may be produced at the corresponding frequency control networks. For a given frequency indicated by the vertical dotted lines of equal height, the loads carried by the different units bear the relations indicated by the horizontal dotted lines. For a different frequency, it is apparent from inspection of the curves that the load bias applied to the individual frequency controllers varies and accordingly the distribution of load varies. As previously stated, the variation is such that for each different frequency, which corresponds to a different value of total load, the load distribution changes, if necessary, so that the units are operating on portions of their input-output curves having the same slope to give economic distribution.

In the system of Fig. 2, the economic division of load between the units which may be at more or less remote points or stations, is effected at the expense of constant frequency. For any normal range of load variation, there is only a slight change in the instantaneous frequency but if constant average frequency is to be maintained, which is sometimes of importance, as when synchronous clocks K are driven from the line L, the individual controls may need to be re-adjusted from time to time by local operators at the several units or stations. A load dispatcher, or someone in equivalent supervisory capacity, may compare the time between a synchronous clock K and a time standard K1 and instruct the several local operators substantially simultaneously to readjust their controls. For example, if the total load has been heavy for a more or less prolonged period of time, the time indicated by synchronous clock K will be slower than that indicated by standard clock K1. The load dispatcher will accordingly instruct the operators to readjust the individual control systems so that they will be in equilibrium at a higher instantaneous frequency. This may be effected in any one or more suitable ways. For example, the contacts of the slide wires D, E, of the units may be shifted manually to change the frequency at which the network is balanced, or alternatively, and as will be clearer after subsequent description of specific types of control mechanism, the relative position of control contacts for motors M4, M5, etc., may be varied with respect to slide wires D and E to change the frequency at which the control system is in equilibrium.

For automatic readjustment to maintain the average frequency constant, a control system similar to that disclosed in co-pending application Serial No. 526,878, filed April 1, 1931, may be utilized.

The apparatus or mechanism for controlling the motors M1 to M6 by deflection of the galvanometers of the corresponding networks, may be of any suitable type. Referring to Fig. 3, each of the galvanometers G1 to G6, may be provided with a movable coil structure 16 to which is affixed a pointer 17 normally positioned between pivoted levers 18, 19. An oscillatable member 20 having a downwardly projecting arm 21, is periodically engaged by a cam 22 mounted upon shaft 23 driven at a substantially constant speed by motor 24. A second cam 22' mounted on shaft 23 engages a pivoted member 25 at the time of or before upward movement of member 20 to move the friction member 26 fastened to the ends of an arm 27 pivoted at the lower end of member 25 out of engagement with a fixed plate 28. Upon movement of pointer 17 from its normal, central position to the right, for example, during upward movement of member 20, it is clamped between the end of pivoted lever 18 and plate 20A secured to member 20 effecting rotation of the lever 18 in a clockwise direction. The lower end of the lever engages an abutment 29 mounted on a plate 30 to which arm 27 is secured to effect rotation of arm 27 in a clockwise direction. Thereafter as cam 22' continues to rotate, the friction members 26 engage plate 28 to hold arm 27 in its new position. During continued rotation of shaft 23, the left hand end of arm 27 is engaged by cam 31 to restore arm 27 to its original, horizontal position, against the frictional resistance between shoes 26 and plate 28. Similarly, upon deflection of pointer 17 to the left arm 27 is rotated in a counterclockwise direction to a position from which it is returned to its original position by cam 32. Cams 31 and 32 of conducting material are insulated from shaft 23 and are in continuous contact with brushes 33 and 34, respectively. Arm 27 in circuit with plate 28 through members 26 comprises the movable element of a reversing switch, the cooperating contacts of which, adapted to be alternatively engaged by arm 27, are comprised by cams 31 and 32. In unit #1 for example, arm 27 corresponds to switch arm 3 and cams 31 and 32 correspond to fixed contacts 4 and 4'. When control mechanism of this character is utilized, as the deflection of the galvanometer is proportional, for example, to the difference in slope of the input-output curves of generating units #1 and #2, the periods of energization of motors M1 and M2 are substantially proportional to the difference between the relative rates of change of input and output of the units.

In the modified form of controller shown in Fig. 4, the disk 28 is rotatable and connected to a shaft 39 on which is mounted a disk 40 carrying the contacts 4 and 4'. The stationary contact 3 upon rotation of shaft in one direction engages contact 4 and for rotation in the opposite direction engages the contact 4', to control the direction of rotation of the pilot motor of the governor control system. The slide wires D and E are carried on similar disks, 41, one of which is shown. Upon deflection of galvanometer coil 16, the needle deflects, to move the arm 27 in a corresponding direction, as previously described, and subsequently when the clutch shoes 26a of the arm are in engagement with disk 28a, one or the other of cams 31, 32 engages the arm to return it to its original position, and since disk 28a is free to move the shaft 39 is rotated, bringing one or the other of the contacts 4, 4' into engagement with fixed contact 3. The pilot motor M changes the governor setting in proper sense to restore the system in balance and when this condition obtains, the contact 3 is again in its new position between the contacts 4, 4'.

Although for purposes of illustration, there have been described a few specific forms of control systems and control apparatus, it will be understood that my invention is not limited thereto but corresponds in scope to the appended claims.

What I claim is:

1. In an electrical system comprising two or more units each comprising a generator and a prime mover therefor, the method of load distribution which comprises varying the energy delivered to one of the prime movers to maintain substantially constant the speed of the associated generator for variations of system load, and varying the energy delivered to the prime movers of the other units to effect operation of the units at points of their input-output curves having the same slope as that of the first unit.

2. An electrical system comprising a group of alternators, individual prime movers for each of said alternators and comprising therewith a unit, means to vary energy supplied to one of said prime movers as the system frequency varies to maintain substantially constant the speed of the associated alternator, and means to vary energy supplied to other prime movers to effect operation of all units at points of their input-output curves having the same slope.

3. A system comprising two or more moving energy-conversion units, means adjustable to vary the inputs of said units, and means responsive to the speed of said units and to difference in relative rates of change of input and output of the units to control said adjustable means.

4. A system comprising two or more moving energy-conversion units, means associated with each unit to produce an effect representative of the relative rate of change of input and output, means producing an effect varying with speed, and means responsive to the effects to ensure operation of the units at points of their input-output curves having the same slope independently of speed.

5. A system comprising two or more alternators, each driven by an individual prime mover and comprising therewith a unit, means associated with each unit to produce an effect representative of the relative rate of change of input and output, means producing an effect upon change of system frequency, and means responsive to the effects to ensure operation of the units at points of their input-output curves having the same slope irrespective of changes in system frequency.

6. A system comprising two or more alternators, each driven by an individual prime mover and comprising therewith a unit, means associated with each unit to produce an effect representative of the relative rate of change of input and output, means responsive to unbalance of said effects to ensure operation of said other units at points of their input-output curves having the same slope as that of the frequency controlled unit.

7. A system comprising two or more alternators, each driven by an individual prime mover and comprising therewith a unit, means associated with each unit for controlling the input thereto in response to changes in system frequency, and means associated with each unit for modifying the frequency control action to effect operation of all of said units at points of their input-output curves having the same slope.

8. A system comprising two or more alternators, each driven by an individual prime mover and comprising therewith a unit, a network unbalanced upon departure of system frequency from a predetermined magnitude to vary the input energy to one of said units, means producing potentials representative of the relative rates of change of input and output of the respective units, and means responsive to unbalance of said potentials for controlling the input to the other of said units to effect operation thereof at points of their input-output curves having the same slope as that of the frequency controlled unit.

9. A system comprising two or more alternators, each driven by an individual prime mover and comprising therewith a unit, means associated with each of said units to produce an effect representative of the relative change of input and output of the unit, a network associated with each of said units responsive to departure of system frequency and whose frequency balance is determined by the magnitude of the effect produced by said associated means, and means responsive to unbalance of said networks to vary the input to said units to effect operation thereof at points of their input-output curves having the same slope, and to establish and maintain a definite system frequency for each value of system load.

10. Apparatus for controlling a plurality of prime mover operated electrical generating units comprising, in combination, means for operating said units with a predetermined load distribution therebetween, means for varying the combined power output of said units automatically in accordance with variations in frequency thereby to maintain substantially constant frequency, and means whereby during the variation in combined output of said units said distributing means automatically maintains the predetermined distribution of power between the units.

11. The combination set forth in claim 10 further characterized in that all of said units have the same characteristics.

12. In combination, a plurality of electric generators connected to supply power to a power system, a prime mover for driving each generator, a speed governor for controlling the prime mover associated with each generator, means for varying the setting of one of said governors and the output of its associated generator in response to a change in the frequency of said system and means actuated by the change in the generator output for effecting a change in settings of the other governors for changing the outputs of the other generators to maintain the frequency of the system substantially constant and a predetermined load division between the generators.

13. In combination, a plurality of electric generators connected to supply power to a power system, a plurality of prime movers for driving said generators, a speed governor for controlling the prime mover associated with each generator, means for varying the setting of each governor, means responsive to variations in the frequency of the system for actuating a certain one of said governor-setting varying means and the output of its associated generator upon the variation of said frequency from the desired value, and electro-magnetic means responsive to departure from the desired relation between the output of the generator variable in response to frequency changes and the remaining generators for actuating the governor-setting varying means associated with the remaining generators for so changing the power input to their associated prime movers that the frequency of the system is maintained substantially constant and a predetermined load division between the generators is maintained.

14. In combination, a plurality of alternators connected to supply power to a system, prime movers for driving said alternators, a speed governor for controlling the prime mover associated with each alternator, a plurality of means for individually varying the settings of the governors, means responsive to variations in the frequency of the system for actuating one of said governor-setting means thereby to change the output of the associated alternator upon change of system frequency, means for producing electrical effects varying in magnitude with change in output of the individual alternators, and means responsive to the differences in magnitudes of said effects for so actuating the other of said governor-setting means that the frequency of the system is maintained substantially constant and a predetermined load division between the alternators is maintained.

EDGAR D. DOYLE.